United States Patent
He (10) Patent No.: US 9,516,070 B2
(45) Date of Patent: Dec. 6, 2016

(54) METHOD FOR ESTABLISHING CHANNEL FOR MANAGING IPV4 TERMINAL AND NETWORK GATEWAY

(71) Applicant: Huawei Device Co., LTD, Shenzhen (CN)

(72) Inventor: Zhiqin He, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 566 days.

(21) Appl. No.: 13/919,511

(22) Filed: Jun. 17, 2013

(65) Prior Publication Data
US 2014/0006584 A1    Jan. 2, 2014

(30) Foreign Application Priority Data

Jun. 28, 2012   (CN) .......................... 2012 1 0218484

(51) Int. Cl.
  *G06F 15/173*    (2006.01)
  *H04L 29/06*     (2006.01)
  *H04L 12/24*     (2006.01)
  *H04L 29/12*     (2006.01)

(52) U.S. Cl.
  CPC .......... *H04L 65/1069* (2013.01); *H04L 41/08* (2013.01); *H04L 61/2517* (2013.01);
  (Continued)

(58) Field of Classification Search
  None
  See application file for complete search history.

(56) References Cited

U.S. PATENT DOCUMENTS

| 8,498,295 B1* | 7/2013 | Saxena | H04L 12/56 370/392 |
| 2003/0041170 A1* | 2/2003 | Suzuki | H04L 12/4675 709/238 |

(Continued)

FOREIGN PATENT DOCUMENTS

| CN | 1747457 A | 3/2006 |
| CN | 102340547 A | 2/2012 |

(Continued)

OTHER PUBLICATIONS

Wing, Port Control Protocol (PCP) draft-ietf-pcp-base-24, 98 pages, Mar. 12, 2012.*

(Continued)

*Primary Examiner* — Joshua Joo
(74) *Attorney, Agent, or Firm* — Slater Matsil, LLP (57) ABSTRACT

A method can be used for establishing a channel for managing an IPv4 terminal. An identifier of a network port of an IPv4 terminal is sent by a home gateway. A listening port is allocated to the IPv4 terminal according to the identifier of the network port of the IPv4 terminal, so as to establish a channel for managing the IPv4 terminal between the network port and the listening port, so that the IPv4 terminal is remotely managed by a management device. An identifier of a network port of an IPv4 terminal sent by the IPv4 terminal through a home gateway is received and a listening port is opened for the IPv4 terminal according to the identifier of the network port and used for receiving a management message sent by a management device.

2 Claims, 7 Drawing Sheets

(52) U.S. Cl.
CPC ...... *H04L 61/2582* (2013.01); *H04L 61/2592* (2013.01); *H04L 69/167* (2013.01)

(56) References Cited

U.S. PATENT DOCUMENTS

| | | | |
|---|---|---|---|
| 2007/0067431 A1 | 3/2007 | Yoshihara et al. | |
| 2008/0201486 A1* | 8/2008 | Hsu | H04L 29/06 |
| | | | 709/238 |
| 2011/0058553 A1* | 3/2011 | Brzozowski | H04L 29/12358 |
| | | | 370/392 |
| 2013/0301598 A1* | 11/2013 | Holm | H04L 29/12066 |
| | | | 370/329 |
| 2015/0039742 A1* | 2/2015 | Vaswani | G01D 4/004 |
| | | | 709/223 |

FOREIGN PATENT DOCUMENTS

| | | |
|---|---|---|
| CN | 102761440 A | 10/2012 |
| EP | 2458799 A1 | 5/2012 |
| WO | 2011046730 A1 | 4/2011 |

OTHER PUBLICATIONS

Wiktionary, definition of "so that", 2 pages, Apr. 2012.*
Wiktionary, definition of "so that", 2 pages, Feb. 2015.*
Wing, D. "Port Control Protocol (PCP)," PCP working group, Cisco, Dec. 3, 2010, 36 pages.
Extended European Search Report received in Application No. 13171632.6-1862 mailed Jul. 26, 2013, 8 pages.

* cited by examiner

METHOD FOR ESTABLISHING CHANNEL FOR MANAGING IPV4 TERMINAL AND NETWORK GATEWAY

CROSS-REFERENCE TO RELATED APPLICATION

This application claims priority to Chinese Patent Application No. 201210218484.8, filed on Jun. 28, 2012, which is hereby incorporated by reference in its entirety.

FIELD OF THE INVENTION

The present invention relates to the communications field, and in particular, to a method for establishing a channel for managing an IPv4 terminal and a network gateway.

BACKGROUND OF THE INVENTION

DS-lite (Double Stack-Lite, Dual Stack Lite) is a transition technology put forward to make an IPv4 terminal compatible in an IPv6 network in the process of transition of the current Internet Protocol from IPv4 to IPv6.

Figure 1:
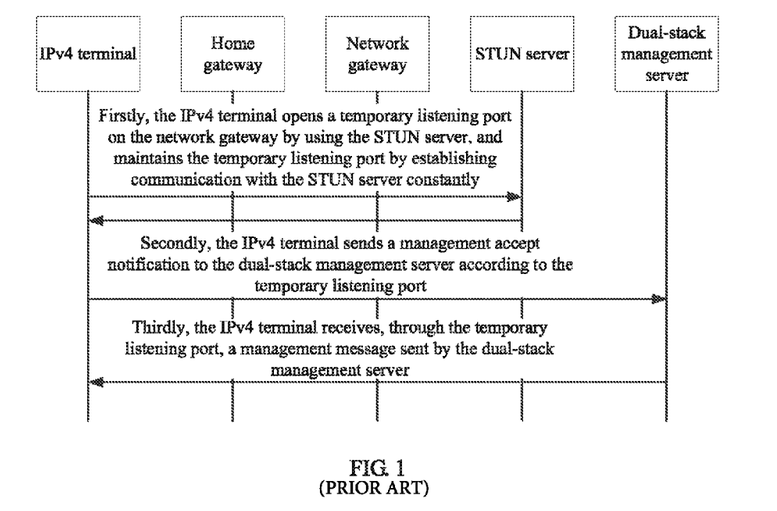
FIG. 1 is an interaction diagram of nodes in a network communication system according to the prior art.

FIG. 1 shows an interaction diagram of nodes in a network communication system in a DS-lite environment in the prior art. The network communication system includes the following nodes: an IPv4 terminal, a home gateway, a network gateway, and a STUN (Simple Traversal of UDP over NAT, simple traversal of UDP over NAT) server and a dual-stack management server in the extranet.

The communication in the DS-lite environment is mainly implemented through an IPv6 tunnel between the home gateway and the network gateway and the NAT (Network Address Translation, network address translation) technology deployed in the network gateway. The IPv4 terminal may communicate with the extranet through the IPv6 tunnel between the home gateway and the network gateway. When the IPv4 terminal is a device such as a camera or a set top box, the IPv4 terminal further needs to be remotely managed by the dual-stack management server in the extranet, and in this case, a channel between the IPv4 terminal and the dual-stack management server needs to be established for managing the IPv4 terminal. However, in the DS-lite environment, the NAT function is undertaken by the network gateway, and the management information triggered by the dual-stack management server in the extranet cannot be directly sent to the IPv4 terminal. Therefore, a problem that must be solved in a DS-lite deployment process is how to establish a channel for managing the IPv4 terminal between the IPv4 terminal and the dual-stack management server.

In the prior art, the problem of establishing a channel for managing the IPv4 terminal between the IPv4 terminal and the dual-stack management server is solved mainly through the STUN protocol, Simple Traversal of UDP (User Datagram Protocol, User Datagram Protocol) over NAT (Network Address Translation, network address mapping). In brief, under the protocol, establishing, by the IPv4 terminal, communication with the dual-stack management server through the home gateway and the network gateway may include: firstly, sending, by the IPv4 terminal, a packet to the STUN server, opening a temporary listening port on the network gateway, and maintaining the temporary listening port by establishing communication with the STUN server constantly; secondly, sending, by the IPv4 terminal, a management accept notification to the dual-stack management server; and thirdly, receiving, by the IPv4 terminal through the temporary listening port, a management message sent by the dual-stack management server.

During the implementation of the present invention, the inventor finds that the prior art has at least the following problems:

When the STUN protocol is used to solve the problem of establishing a channel for managing the IPv4 terminal between the IPv4 terminal and the dual-stack management server, a large number of STUN servers need to be deployed in the huge network. Therefore, too many hardware devices not only increase complexity and difficulty of the DS-lite deployment process, but also increase deployment and maintenance costs.

SUMMARY OF THE INVENTION

In one aspect, a method for establishing a channel for managing an IPv4 terminal is provided, where the method includes:

receiving an identifier of a network port of an IPv4 terminal sent by a home gateway; and allocating a listening port to the IPv4 terminal according to the identifier of the network port of the IPv4 terminal, so as to establish a channel for managing the IPv4 terminal between the network port and the listening port, so that the IPv4 terminal is remotely managed by a management device.

In another aspect, a method for verifying a channel for managing an IPv4 terminal is provided, where the method includes:

receiving a first mapping relationship that is sent by an IPv4 terminal through a channel established by a network gateway for managing the IPv4 terminal, where the first mapping relationship is a binding relationship between an identifier of the IPv4 terminal and an identifier that is received by the IPv4 terminal and sent from a home gateway;

obtaining a second mapping relationship sent by the home gateway, where the second mapping relationship is a binding relationship between an identifier, which is received by the home gateway and sent from the IPv4 terminal, and an identifier of the home gateway; and when determining that the second mapping relationship is the same as the first mapping relationship, determining that the channel for managing the IPv4 terminal is established correctly.

In still another aspect, a network gateway is provided, where the network gateway specifically includes:

a receiving unit, configured to receive an identifier of a network port of an IPv4 terminal sent by a home gateway; and a port controlling unit, configured to allocate a listening port to the IPv4 terminal according to the identifier of the network port of the IPv4 terminal received by the receiving unit, so as to establish a channel for managing the IPv4 terminal between the network port and the listening port, so that the IPv4 terminal is remotely managed by a management device.

In still another aspect, a management device is provided, where the management device includes:

a first receiving unit, configured to receive a first mapping relationship that is sent by an IPv4 terminal through a channel established by a network gateway for managing the IPv4 terminal, where the first mapping relationship is a binding relationship between an identifier of the IPv4 terminal and an identifier that is received by the IPv4 terminal and sent from a home gateway;

a second receiving unit, configured to receive a second mapping relationship sent by the home gateway, where the second mapping relationship is a binding relationship between an identifier, which is received by the home gateway and sent from the IPv4 terminal, and an identifier of the home gateway; and a determining unit, configured to: when determining that the second mapping relationship is the same as the first mapping relationship, determine that the channel for managing the IPv4 terminal is established correctly.

In still another aspect, a method for forwarding data of a channel for managing an IPv4 terminal is provided, where the method includes:

receiving an identifier of a network port of an IPv4 terminal sent by the IPv4 terminal;

sending the received identifier of the network port of the IPv4 terminal to a network gateway; and receiving a mapping relationship which is sent by the network gateway and between a listening port allocated to the IPv4 terminal based on the identifier of the network port of the IPv4 terminal and the network port of the IPv4 terminal, so that data between the network port and the listening port is forwarded according to the mapping relationship.

In still another aspect, a home gateway is provided, where the home gateway includes:

a first receiving unit, configured to receive an identifier of a network port of an IPv4 terminal sent by the IPv4 terminal;

a first sending unit, configured to send the identifier of the network port of the IPv4 terminal received by the first receiving unit to a network gateway; and a second receiving unit, configured to receive a mapping relationship which is sent by the network gateway and between a listening port allocated to the IPv4 terminal based on the identifier of the network port of the IPv4 terminal and the network port of the IPv4 terminal, so that data between the network port and the listening port is forwarded according to the mapping relationship.

DETAILED DESCRIPTION OF THE EMBODIMENTS

To make the objectives, technical solutions, and advantages of the present invention more comprehensible, the following further describes the embodiments of the present invention in detail with reference to the accompanying drawings.

Embodiment 1

Figure 2:
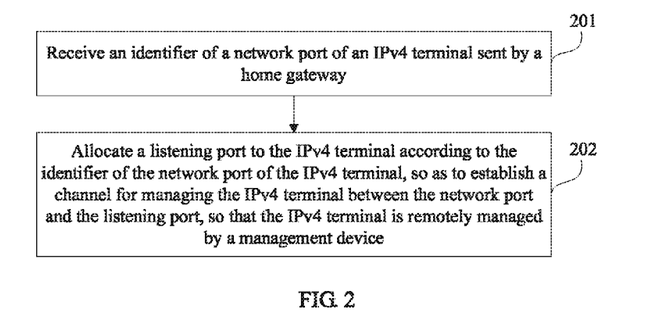
FIG. 2 is a flowchart of a method for establishing a channel for managing an IPv4 terminal according to Embodiment 1 of the present invention.

FIG. 2 shows a flowchart of a method for establishing a channel for managing an IPv4 terminal according to Embodiment 1 of the present invention. The method for establishing a channel for managing an IPv4 terminal may be used for establishing a channel for managing an IPv4 terminal in a DS-lite network environment including an IPv4 terminal, a home gateway, a network gateway, and a management device, where the method may include:

Step 201: Receive an identifier of a network port of an IPv4 terminal sent by a home gateway.

Specifically, the network gateway receives a PCP request which is sent by the home gateway and carries the identifier of the network port of the IPv4 terminal.

The IPv4 terminal sends, to the home gateway, a DHCP (Dynamic Host Configuration Protocol, Dynamic Host Configuration Protocol) request carrying the identifier of the network port of the IPv4 terminal, and the home gateway sends a PCP (Port Control Protocol, Port Control Protocol) request to the network gateway according to the DHCP request, where the PCP request also carries the identifier of the network port of the IPv4 terminal.

Step 202: Allocate a listening port to the IPv4 terminal according to the identifier of the network port of the IPv4 terminal, so as to establish a channel for managing the IPv4 terminal between the network port and the listening port, so that the IPv4 terminal is remotely managed by a management device.

The allocated listening port is used for listening in to the management message sent by the management device. In this embodiment, the listening port corresponds to the network port of the IPv4 terminal on a one-to-one basis.

Specifically, the network gateway allocates an unused port to the IPv4 terminal as a listening port of the IPv4 terminal, and establishes a mapping relationship between the listening port and the network port of the IPv4 terminal. After sending the established port mapping relationship to the home gateway, the network gateway may send, to the home gateway, the management message received by the listening port from the management device (such as a dual-stack management server), and the home gateway forwards the management message to the network port of the IPv4 terminal according to the port mapping relationship. The listening port allocated by the network gateway to the IPv4 terminal may be long-time maintained, and the time may be the current start and run duration of the IPv4 terminal.

To conclude, with the method for establishing a channel for managing an IPv4 terminal according to Embodiment 1, the network gateway receives an identifier of a network port of an IPv4 terminal sent through the home gateway, and opens, for the IPv4 terminal according to the identifier of the network port, a listening port that may be long-time maintained, where the listening port is used for receiving a management message sent by the management device to the IPv4 terminal, so as to establish a channel for remotely managing the IPv4 terminal by the management device for the IPv4 terminal. This overcomes the problem in the prior art that a third-party device needs to assist in establishing a channel for remotely managing the IPv4 terminal by the management device for the IPv4 terminal and that maintenance duration is short. Thereby, the objectives of simplifying DS-lite deployment, reducing maintenance difficulty, and saving deployment and maintenance costs are achieved.

Embodiment 2

Figure 3:
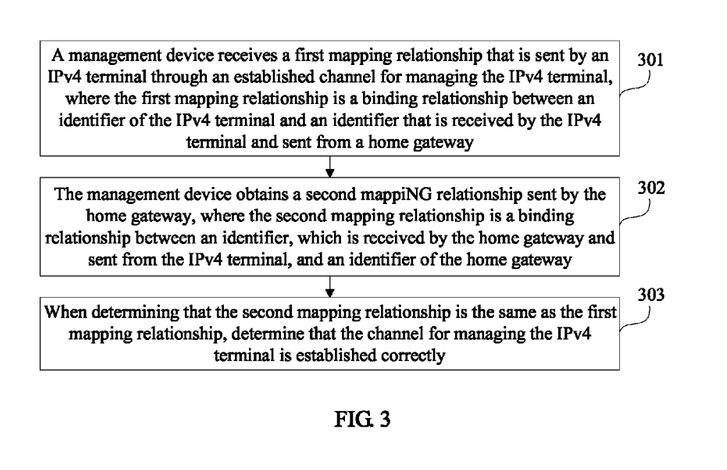
FIG. 3 is a flowchart of a method for verifying a channel for managing an IPv4 terminal according to Embodiment 2 of the present invention.

FIG. 3 shows a flowchart of a method for verifying a channel for managing an IPv4 terminal according to Embodiment 2 of the present invention. The method for verifying a channel for managing an IPv4 terminal may be used for verifying whether a channel for managing an IPv4 terminal is established correctly in a DS-lite network environment including an IPv4 terminal, a home gateway, a network gateway, and a management device, where the method for verifying a channel for managing an IPv4 terminal may include:

Step 301: A management device receives a first mapping relationship that is sent by an IPv4 terminal through an established channel for managing the IPv4 terminal, where the first mapping relationship is a binding relationship between an identifier of the IPv4 terminal and an identifier that is received by the IPv4 terminal and sent from a home gateway.

The IPv4 terminal receives the identifier of the home gateway sent by the home gateway, and uses the binding relationship between the identifier of the home gateway and the identifier of the IPv4 terminal as a first mapping relationship. After the channel for managing the IPv4 terminal is established, the IPv4 terminal sends the first mapping relationship to the management device through the established channel for managing the IPv4 terminal.

It should be noted that, when sending a message to the management device, the IPv4 terminal only needs to learn information such as public IP address without establishing a channel for managing the IPv4 terminal, but a path for sending the message is consistent with the established channel for managing the IPv4 terminal.

Step 302: The management device obtains a second mapping relationship sent by the home gateway, where the second mapping relationship is a binding relationship between an identifier, which is received by the home gateway and sent from the IPv4 terminal, and an identifier of the home gateway.

The home gateway receives the identifier of the IPv4 terminal sent by the IPv4 terminal, and uses the binding relationship between the identifier of the IPv4 terminal and the identifier of the home gateway as a second mapping relationship. After the channel for managing the IPv4 terminal is established, the home gateway sends the second mapping relationship to the management device.

Step 303: When determining that the second mapping relationship is the same as the first mapping relationship, determine that the channel for managing the IPv4 terminal is established correctly.

The management device compares the identifier of the IPv4 terminal and the identifier of the home gateway in the second mapping relationship with the identifier of the IPv4 terminal and the identifier of the home gateway in the first mapping relationship, respectively, and if the two mapping relationships are completely the same, the management device determines that the channel for managing the IPv4 terminal is established correctly.

To conclude, with the method for verifying a channel for managing an IPv4 terminal according to the second embodiment, the binding relationship between the identifier of the IPv4 terminal and the identifier of the home gateway is obtained from the IPv4 terminal and the home gateway respectively, and the binding relationship between the home gateway and the IPv4 terminal is verified. Thereby, the objective of improving accuracy of managing the IPv4 terminal by the management device is achieved.

Embodiment 3

Figure 4:
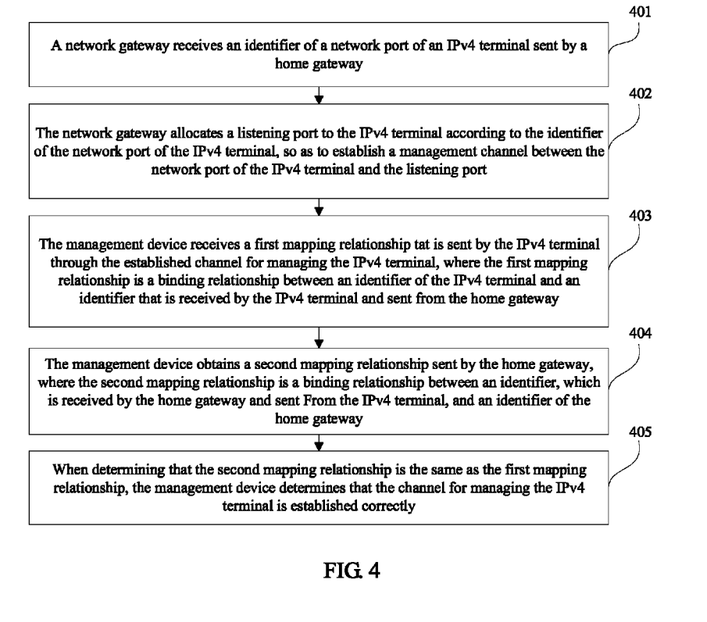
FIG. 4 is a flowchart of a method for establishing and verifying a channel for managing an IPv4 terminal according to Embodiment 3 of the present invention.

To specifically describe the methods provided by Embodiment 1 and Embodiment 2, FIG. 4 shows a flowchart of a method for establishing and verifying a channel for managing an IPv4 terminal according to Embodiment 3 of the present invention. The method may be used for establishing and verifying a channel for managing an IPv4 terminal in a DS-lite network environment including nodes such as an IPv4 terminal, a home gateway, a network gateway, and a management device, where the management device is a dual-stack management server. The method procedure may specifically include steps:

Step 401: A network gateway receives an identifier of a network port of an IPv4 terminal sent by a home gateway.

Specifically, the IPv4 terminal sends the identifier of the network port of the IPv4 terminal to the home gateway, and the home gateway sends the received identifier of the network port of the IPv4 terminal to the network gateway, where the identifier of the network port of the IPv4 terminal may be a port number of the network port.

Step 402: The network gateway allocates a listening port to the IPv4 terminal according to the identifier of the network port of the IPv4 terminal, so as to establish a channel for managing the IPv4 terminal between the network port of the IPv4 terminal and the listening port.

After receiving the identifier of the network port of the IPv4 terminal, the network gateway allocates an unused port to the IPv4 terminal as the listening port of the IPv4 terminal, and establishes a mapping relationship between the listening port and the network port of the IPv4 terminal; specifically, the network gateway may establish a mapping relationship between the port number of the listening port and the port number of the network port of the IPv4 terminal.

Further, after establishing the mapping relationship between the listening port and the network port of the IPv4 terminal, the network gateway returns the mapping relationship between the listening port and the network port of the IPv4 terminal to the home gateway. At this time, according to the mapping relationship, the home gateway may forward, to the network port of the IPv4 terminal, a management message sent by a management device and received by the listening port, that is, the channel for managing the IPv4 terminal between the network port of the IPv4 terminal and the listening port is established.

Step 403: The management device receives a first mapping relationship that is sent by the IPv4 terminal through the established channel for managing the IPv4 terminal, where the first mapping relationship is a binding relationship between an identifier of the IPv4 terminal and an identifier which is received by the IPv4 terminal and sent from the home gateway.

Specifically, the IPv4 terminal may beforehand receive the identifier of the home gateway sent by the home gateway, and use the binding relationship between the identifier of the home gateway and the identifier of the IPv4 terminal as a first mapping relationship, where the identifier of the home gateway is a special identifier used for distinguishing the home gateway in the network, and may be the MAC address of the home gateway, and so on, and likewise, the identifier of the IPv4 terminal may also be the MAC address of the IPv4 terminal.

After the channel for managing the IPv4 terminal is established, the management device may receive the first mapping relationship actively sent by the IPv4 terminal; or may also send a request for obtaining the first mapping relationship to the IPv4 terminal, and receive the first mapping relationship that is returned by the IPv4 terminal according to the request.

Step 404: The management device obtains a second mapping relationship sent by the home gateway, where the second mapping relationship is a binding relationship between an identifier, which is received by the home gateway and sent from the IPv4 terminal, and an identifier of the home gateway.

Correspondingly, the home gateway may also beforehand receive the identifier of the IPv4 terminal sent by the IPv4 terminal, and use the binding relationship between the obtained identifier of the IPv4 terminal and the identifier of the home gateway as a second mapping relationship; the management device may receive the second mapping relationship actively sent by the home gateway; or may also send a request for obtaining the second mapping relationship to the home gateway, and receive the second mapping relationship that is returned by the home gateway according to the request.

It should be noted that the management device may obtain the first mapping relationship before or after obtaining the second mapping relationship, or obtain the two mapping relationships simultaneously.

Step 405: When determining that the second mapping relationship is the same as the first mapping relationship, the management device determines that the channel for managing the IPv4 terminal is established correctly.

The management device determines whether the second mapping relationship is the same as the first mapping relationship, and if they are the same, the channel for managing the IPv4 terminal is established correctly. Specifically, the management device may compare the identifier of the IPv4 terminal and the identifier of the home gateway in the second mapping relationship with the identifier of the IPv4 terminal and the identifier of the home gateway in the first mapping relationship, respectively, and if the two mapping relationships are completely the same, it indicates that the channel for managing the IPv4 terminal is established correctly.

To conclude, with the method for establishing and verifying a channel for managing an IPv4 terminal according to the third embodiment, the network gateway receives an identifier of a network port of the IPv4 terminal sent through the home gateway, and opens a listening port for the IPv4 terminal according to the identifier of the network port, where the listening port is used for receiving a management message sent by the management device to the IPv4 terminal; a channel for managing the IPv4 terminal may be established without a third-party device. Thereby, the objectives of simplifying DS-lite deployment, reducing maintenance difficulty, and saving deployment and maintenance costs are achieved. In addition, with the method for establishing and verifying a channel for managing an IPv4 terminal according to Embodiment 3, the management device obtains the binding relationship between the identifier of the IPv4 terminal and the identifier of the home gateway from the IPv4 terminal and the home gateway respectively to verify the binding relationship between the home gateway and the IPv4 terminal, thus achieving the objective of improving accuracy of managing the IPv4 terminal by the management device.

Embodiment 4

Figure 5:
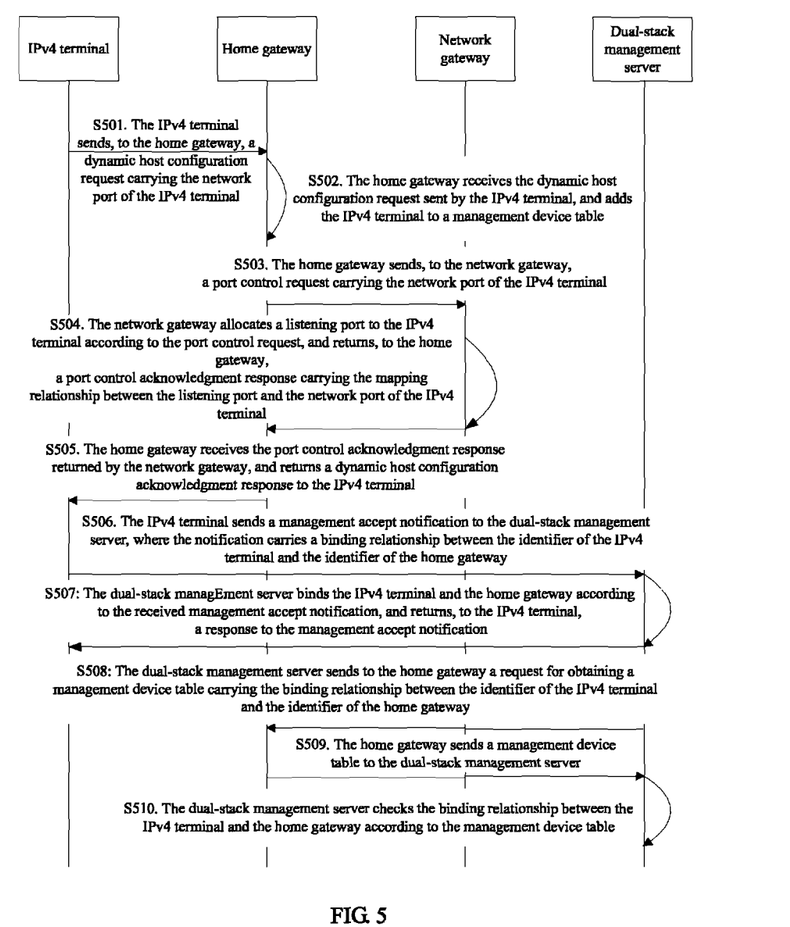
FIG. 5 is a flowchart of a method for establishing and verifying a channel for managing an IPv4 terminal according to Embodiment 4 of the present invention.

FIG. 5 shows a flowchart of a method for establishing and verifying a channel for managing an IPv4 terminal according to Embodiment 4 of the present invention. The method for establishing and verifying a channel for managing an IPv4 terminal may be used in a DS-lite network environment including nodes such as an IPv4 terminal, a home gateway, a network gateway, and a management device to establish a channel for receiving a management message by the IPv4 terminal from the management device, where the management device is a dual-stack management server. For example, a channel for managing an IPv4 terminal is established based on the PCP protocol, where the procedure for the method for establishing and verifying a channel for managing an IPv4 terminal may specifically include the following steps:

Step 501: The IPv4 terminal sends, to the home gateway, a dynamic host configuration request carrying the identifier of the network port of the IPv4 terminal.

Specifically, after being started, the IPv4 terminal automatically sends a DHCP Discover message for searching a local area network for a home gateway which can provide a dynamic host configuration service; after receiving the DHCP Discover sent by the IPv4 terminal, the home gateway returns, to the IPv4 terminal, a response (DHCP Offer) to the DHCP Discover; after receiving the DHCP Offer returned by the home gateway, the IPv4 terminal sends a dynamic host configuration request (DHCP Request) to the home gateway, where the dynamic host configuration request carries the identifier of the network port of the IPv4 terminal and the identifier of the IPv4 terminal, where the identifier of the IPv4 terminal is used for distinguishing the IPv4 terminal in the network and may be a MAC (Media Access Control, media access control) address of the IPv4 terminal and so on; in addition, all messages sent between the IPv4 terminal and the home gateway are messages in an IPv4 packet format.

Step 502: The home gateway receives the dynamic host configuration request sent by the IPv4 terminal, and adds the IPv4 terminal to a management device table.

The home gateway (HGW, Home Gateway) pre-creates a management device table. After receiving the dynamic host configuration request sent by the IPv4 terminal, the home gateway adds the identifier of the IPv4 terminal to the management device table; in addition, the management device table further includes the identifier of the home gateway, and a binding relationship between the identifier of the IPv4 terminal and the identifier of the home gateway is also established in the management device table. Correspondingly, the identifier of the home gateway may also be the MAC address of the home gateway.

Step 503: The home gateway sends, to the network gateway, a port control request carrying the network port of the IPv4 terminal.

After adding the identifier of the IPv4 terminal to the management device table, the home gateway sends a port control request (PCP Request) to the network gateway through an IPv6 tunnel between the home gateway and the network gateway, requesting the network gateway to allocate a listening port to the IPv4 terminal, where the port control request carries the identifier of the network port of the IPv4 terminal.

Step 504: The network gateway allocates a listening port to the IPv4 terminal according to the port control request, and returns, to the home gateway, a port control acknowledgment response carrying the mapping relationship between the listening port and the network port of the IPv4 terminal.

Specifically, after receiving the port control request, the network gateway allocates an unused port to the IPv4 terminal as a listening port of the IPv4 terminal, and establishes a mapping relationship between the listening port and the network port of the IPv4 terminal carried in the port control request; in addition, the network gateway binds the listening port to the IPv6 tunnel correspondingly when the port control request is received, so that the message received by the listening port is sent to the home gateway through the IPv6 tunnel.

After establishing the mapping relationship between the listening port and the network port of the IPv4 terminal, the network gateway returns a port control acknowledgment response (PCP Ack) to the home gateway, where the port control acknowledgment response carries the mapping relationship between the listening port and the network port of the IPv4 terminal.

All messages sent between the home gateway and the network gateway are messages in an IPv6 packet format.

Step 505: The home gateway receives the port control acknowledgment response returned by the network gateway, and returns a dynamic host configuration acknowledgment response to the IPv4 terminal.

After receiving the port control acknowledgment response returned by the network gateway, the home gateway obtains and stores the mapping relationship between the listening port and the network port of the IPv4 terminal. In this case, the IPv4 terminal may be managed by the dual-stack management server through the listening port. Specifically, the network gateway sends the management message received by the listening port to the home gateway through an IPv6 tunnel bound with the listening port, and then the home gateway forwards the management message to the IPv4 terminal according to the mapping relationship between the listening port and the network port of the IPv4 terminal. At this time, the channel for managing the IPv4 terminal is established.

In this case, the home gateway returns a dynamic host configuration acknowledgment response to the IPv4 terminal to notify the IPv4 terminal that dynamic host configuration is complete. The dynamic host configuration acknowledgment response includes information such as a private address allocated by the home gateway to the IPv4 terminal and the identifier of the home gateway.

Step 506: The IPv4 terminal sends a management accept notification to the dual-stack management server, where the notification carries a binding relationship between the identifier of the IPv4 terminal and the identifier of the home gateway.

To verify whether the channel established in the above step for managing the IPv4 terminal is correct, in this embodiment, the IPv4 terminal may send a management accept notification according to the public IP address of the dual-stack management server, where the notification carries a binding relationship between the identifier of the IPv4 terminal and the identifier which is received by the IPv4 terminal and sent from the home gateway. The binding relationship is the first mapping relationship in Embodiment 2 and Embodiment 3.

After receiving the dynamic host configuration acknowledgment response returned by the home gateway, the IPv4 terminal binds the identifier of the home gateway, which is included in the dynamic host configuration acknowledgment response, to the identifier of the IPv4 terminal, and sends a management accept notification to the dual-stack management server, where the management accept notification carries a binding relationship between the identifier of the IPv4 terminal and the identifier which is received by the IPv4 terminal and sent from the home gateway. It should be noted that the IPv4 terminal may also obtain the identifier of the home gateway by other means, for example, the home gateway may add the identifier of the home gateway to the DHCP Offer, namely, a response to the DHCP Discover, and in this case, the IPv4 terminal may obtain the identifier of the home gateway from the DHCP Offer.

In the DS-lite network environment, the message in the IPv4 packet format sent by the IPv4 terminal needs to be encapsulated into the IPv6 packet format on the home gateway, and is sent to the extranet through an IPv6 tunnel between the home gateway and the network gateway. In actual applications, after the home gateway encapsulates, according to the encapsulation protocol defined by RFC 2473 (IPv4-in-IPv6), the management accept notification sent by the IPv4 terminal, the home gateway sends the notification to the network gateway through the IPv6 tunnel between the home gateway and the network gateway; the network gateway forwards the notification to the dual-stack management server, and the dual-stack management server decapsulates the received message to obtain a management accept notification in the IPv4 format. Likewise, the message sent by the dual-stack management server to the IPv4 terminal through the listening port also needs to undergo the step of IPv4-IPv6 encapsulation and decapsulation.

It should be noted that the dual-stack management server is a management server with the IPv4 protocol added to the IPv6 protocol stack, that is, the dual-stack management server supports both the IPv6 protocol and the IPv4 protocol.

Step 507: The dual-stack management server binds the IPv4 terminal and the home gateway according to the received management accept notification, and returns, to the IPv4 terminal, a response to the management accept notification.

Specifically, after receiving the management accept notification sent by the IPv4 terminal, the dual-stack management server establishes a binding relationship between the IPv4 terminal and the home gateway according to the binding relationship which is carried in the management accept notification and between the identifier of the IPv4 terminal and the identifier which is received by the IPv4 terminal and sent from the home gateway.

Step 508: The dual-stack management server sends to the home gateway a request for obtaining a management device table carrying the binding relationship between the identifier of the IPv4 terminal and the identifier of the home gateway.

To improve accuracy of sending a management message to the IPv4 terminal, the dual-stack management server needs to initiate a cross check through the IPv6 network to further acknowledge the binding relationship between the IPv4 terminal and the home gateway. Therefore, after establishing the binding relationship between the IPv4 terminal and the home gateway, the dual-stack management server may send, to the home gateway, a request for obtaining a management device table carrying the binding relationship between the identifier of the home gateway and the identifier which is received by the home gateway and sent from the IPv4 terminal. The binding relationship that is carried in the management device table and between the identifier of the home gateway and the identifier which is received by the home gateway and sent from the IPv4 terminal is the second binding relationship in the second and third embodiments.

Step 509: The home gateway sends a management device table to the dual-stack management server.

The home gateway returns a management device table to the dual-stack management server after receiving the request for obtaining a management device table.

In addition, the messages sent between the dual-stack management server and the home gateway are all in the IPv6 packet format.

Step 510: The dual-stack management server checks the binding relationship between the IPv4 terminal and the home gateway according to the management device table.

Specifically, the dual-stack management server may compare the binding relationship (first mapping relationship) which is carried in the management accept notification sent by the IPv4 terminal and between the identifier of the IPv4 terminal and the identifier of the home gateway with the binding relationship (second mapping relationship) which is carried in the management device table sent by the home gateway and between the identifier of the IPv4 terminal and the identifier of the home gateway; if the identifier of the IPv4 terminal and the identifier of the home gateway in the first mapping relationship are completely the same as the identifier of the IPv4 terminal and the identifier of the home gateway in the second mapping relationship, it is finally acknowledged that the binding relationship between the IPv4 terminal and the home gateway is correct, that is, the channel for managing the IPv4 terminal is established correctly.

To conclude, with the method for establishing and verifying a channel for managing an IPv4 terminal according to Embodiment 4, the network gateway receives an identifier of a network port of the IPv4 terminal sent through the home gateway, and opens a listening port for the IPv4 terminal according to the identifier of the network port, where the listening port is used for receiving a management message sent by the management device to the IPv4 terminal; a channel for managing the IPv4 terminal may be established without a third-party device. Thereby, the objectives of simplifying DS-lite deployment, reducing maintenance difficulty, and saving deployment and maintenance costs are achieved. In addition, with the method for establishing and verifying a channel for managing an IPv4 terminal according to Embodiment 4, the management device obtains the binding relationship between the identifier of the IPv4 terminal and the identifier of the home gateway from the IPv4 terminal and the home gateway respectively to verify the binding relationship between the home gateway and the IPv4 terminal, thus achieving the objective of improving accuracy of managing the IPv4 terminal by the management device.

Embodiment 5

Figure 6:
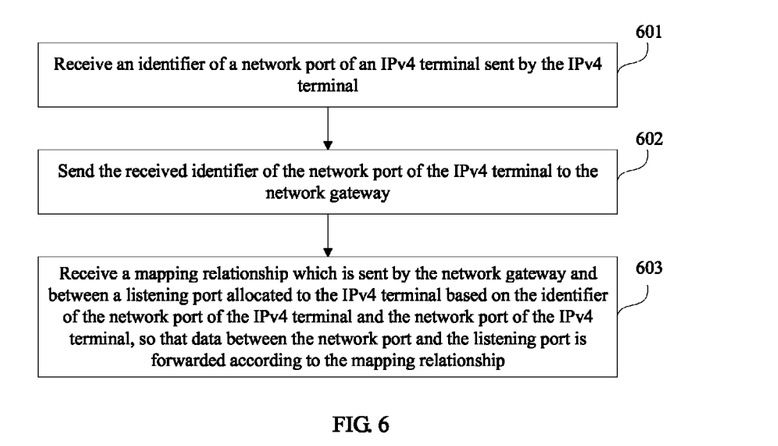
FIG. 6 is a flowchart of a method for forwarding data of a channel for managing an IPv4 terminal according to Embodiment 5 of the present invention.

FIG. 6 shows a flowchart of a method for forwarding data of a channel for managing an IPv4 terminal according to Embodiment 5 of the present invention. The method may be used for forwarding data of a channel for managing an IPv4 terminal in a DS-lite network environment including nodes such as an IPv4 terminal, a home gateway, a network gateway, and a management device. The method for forwarding data of a channel for managing an IPv4 terminal may include the following steps:

Step 601: Receive an identifier of a network port of an IPv4 terminal sent by the IPv4 terminal.

Step 602: Send the received identifier of the network port of the IPv4 terminal to the network gateway.

Step 603: Receive a mapping relationship which is sent by the network gateway and between a listening port allocated to the IPv4 terminal based on the identifier of the network port of the IPv4 terminal and the network port of the IPv4 terminal, so that data between the network port and the listening port is forwarded according to the mapping relationship.

To conclude, with the method for forwarding data of a channel for managing an IPv4 terminal according to Embodiment 5, an identifier of a network port of an IPv4 terminal is forwarded to the network gateway, and the mapping relationship which is sent by the network gateway and between a listening port allocated to the IPv4 terminal based on the identifier of the network port of the IPv4 terminal and the network port of the IPv4 terminal is received. Thereby, the objective of forwarding data of the channel for managing the IPv4 terminal is achieved.

Embodiment 6

Figure 7:
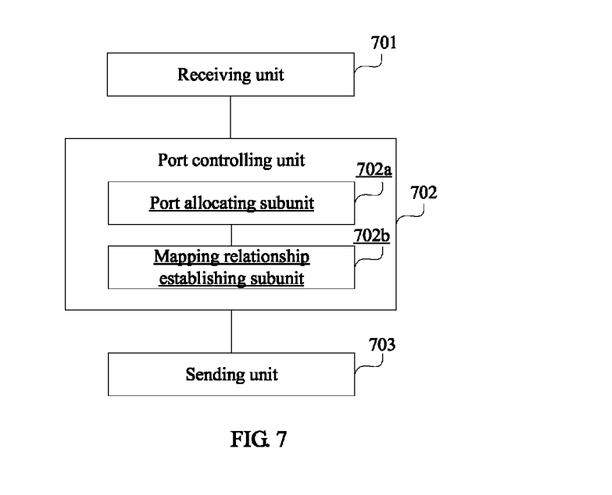
FIG. 7 is a schematic structural diagram of a network gateway according to Embodiment 6 of the present invention.

FIG. 7 shows a schematic structural diagram of a network gateway according to Embodiment 6 of the present invention, where the network gateway may be used in a DS-lite network environment. The network gateway may specifically include:

a receiving unit 701, configured to receive an identifier of a network port of an IPv4 terminal sent by a home gateway; and a port controlling unit 702, configured to allocate a listening port to the IPv4 terminal according to the identifier of the network port of the IPv4 terminal received by the receiving unit 701, so as to establish a channel for managing the IPv4 terminal between the network port and the listening port, so that the IPv4 terminal is remotely managed by a management device.

Specifically, the port controlling unit 702 includes:

a port allocating subunit 702a, configured to allocate a listening port to the IPv4 terminal; and a mapping relationship establishing subunit 702b, configured to establish a mapping relationship between the listening port allocated by the port allocating subunit 702a and the network port of the IPv4 terminal.

In addition, the network gateway further includes:

a sending unit 703, configured to send, to the home gateway, the mapping relationship established by the mapping relationship establishing subunit 702b, so that the home gateway forwards data between the network port and the listening port according to the mapping relationship.

Specifically, after the home gateway receives the mapping relationship sent by the sending unit 703, the channel for managing the IPv4 terminal is established. When the listening port of the IPv4 terminal receives a management message sent by a dual-stack management server, the network gateway may send the management message to the home gateway, and the home gateway forwards the management message to the IPv4 terminal according to the mapping relationship.

It should be noted that functional units of the network gateway provided by this embodiment may be mapped to different circuits, for example, a receiving circuit, a sending circuit, a port controlling circuit, and a mapping relationship establishing circuit; in addition, all functions of the network gateway provided by this embodiment may be completed by a same processor, for example, a same processor completes tasks such as sending, receiving, port control, and mapping relationship establishment.

The network gateway provided by Embodiment 6 opens a listening port of the IPv4 terminal according to the identifier of the network port of the IPv4 terminal sent by the home gateway, and a channel for managing the IPv4 terminal by the dual-stack management server for the IPv4 terminal is established without a third-party device. Thereby, the objectives of simplifying DS-lite deployment, reducing maintenance difficulty, and saving deployment and maintenance costs are achieved.

Embodiment 7

Figure 8:
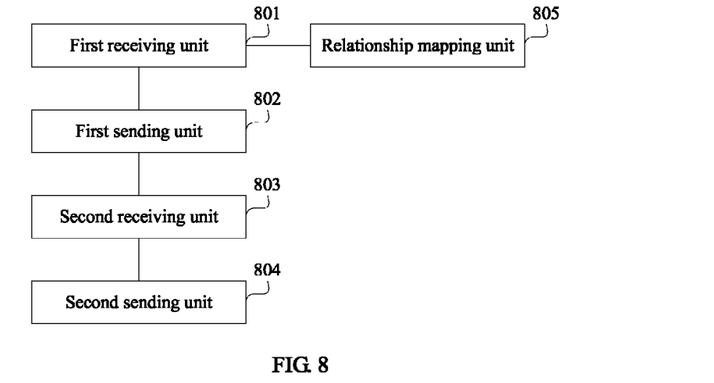
FIG. 8 is a schematic structural diagram of a home gateway according to Embodiment 7 of the present invention.

FIG. 8 shows a schematic structural diagram of a home gateway according to Embodiment 7 of the present invention, where the home gateway may be used in a DS-lite network environment. The home gateway may specifically include:

a first receiving unit 801, configured to receive an identifier of a network port of an IPv4 terminal sent by the IPv4 terminal; and a first sending unit 802, configured to send the identifier of the network port of the IPv4 terminal received by the first receiving unit 801 to a network gateway.

The network gateway allocates a listening port to the IPv4 terminal according to the identifier of the network port of the IPv4 terminal sent by the first sending unit 802, establishes a mapping relationship between the network port of the IPv4 terminal and the listening port, and returns the established mapping relationship to the home gateway. Therefore, the home gateway further includes:

a second receiving unit 803, configured to receive a mapping relationship which is sent by the network gateway and between a listening port allocated to the IPv4 terminal based on the identifier of the network port of the IPv4 terminal and the network port of the IPv4 terminal, so as to forward the data between the network port and the listening port according to the mapping relationship.

After the home gateway receives the mapping relationship returned by the network gateway, the channel for managing the IPv4 terminal is established, that is, the home gateway may forward, according to the mapping relationship, the management message received by the listening port of the IPv4 terminal on the network gateway to the IPv4 terminal.

To acknowledge accuracy of establishment of the channel for managing the IPv4 terminal, the management device needs to obtain the binding relationship between the identifier of the IPv4 terminal and the identifier of the home gateway from the IPv4 terminal and the home gateway respectively, and compare obtained binding relationships to acknowledge accuracy of establishment of the channel for managing the IPv4 terminal. Therefore, the first receiving unit 801 is further configured to receive an identifier of the IPv4 terminal from the IPv4 terminal; and the home gateway further includes:

a relationship mapping unit 805, configured to use the identifier of the IPv4 terminal received by the first receiving unit 801 and the identifier of the home gateway as a second mapping relationship; and a second sending unit 804, configured to send the second mapping relationship to the management device after the second receiving unit 803 receives the mapping relationship which is sent by the network gateway and between the listening port and the network port of the IPv4 terminal.

To conclude, the home gateway provided by Embodiment 7 forwards the identifier of the network port of the IPv4 terminal sent by the IPv4 terminal so that the network gateway opens the listening port of the IPv4 terminal, and a channel for managing the IPv4 terminal by the management device is established without a third-party device. Thereby, the objectives of simplifying DS-lite deployment, reducing maintenance difficulty, and saving deployment and maintenance costs are achieved. In addition, the home gateway provided by Embodiment 7 sends the binding relationship between the identifier of the IPv4 terminal and the identifier of the home gateway to the management device, so that the management device verifies the binding relationship between the home gateway and the IPv4 terminal, thus achieving the objective of acknowledging accuracy of establishment of the channel for managing the IPv4 terminal.

Embodiment 8

Figure 9:
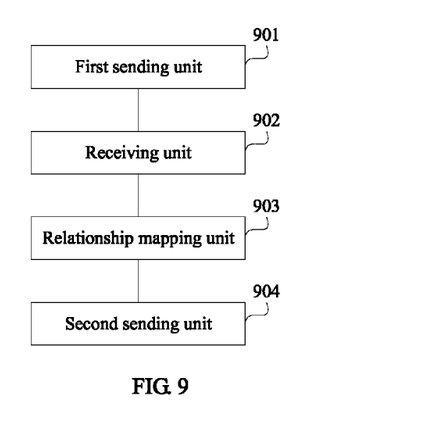
FIG. 9 is a schematic structural diagram of an IPv4 terminal according to Embodiment 8 of the present invention.

FIG. 9 is a schematic structural diagram of an IPv4 terminal according to Embodiment 8 of the present invention. The IPv4 terminal may specifically include:

a first sending unit 901, configured to send an identifier of a network port of the IPv4 terminal to the home gateway.

The home gateway forwards the identifier of the network port to the network gateway after receiving the identifier of the network port of the IPv4 terminal sent by the first sending unit 901, so that the network gateway allocates a listening port to the IPv4 terminal and establishes a mapping relationship between the network port of the IPv4 terminal and the listening port. After the home gateway receives the mapping relationship which is established by the network gateway and between the network port of the IPv4 terminal and the listening port, the channel for managing the IPv4 terminal is established.

To verify accuracy of the established channel for managing the IPv4 terminal, the IPv4 terminal further includes:

a receiving unit 902, configured to receive an identifier of the home gateway sent by the home gateway;

a relationship mapping unit 903, configured to use the identifier of the home gateway received by the receiving unit 902 and the identifier of the IPv4 terminal as a first mapping relationship; and a second sending unit 904, configured to send the first mapping relationship to the management device.

To conclude, the IPv4 terminal provided by Embodiment 8 sends the identifier of the network port of the IPv4 terminal to the network gateway through the home gateway; the network gateway opens, in the extranet, the listening port of the IPv4 terminal; and a channel for managing the IPv4 terminal by the management device is established without a third-party device. Thereby, the objectives of simplifying DS-lite deployment, reducing maintenance difficulty, and saving deployment and maintenance costs are achieved. In addition, the IPv4 terminal provided by Embodiment 8 sends the binding relationship between the identifier of the IPv4 terminal and the identifier of the home gateway to the management device, so that the management device verifies the binding relationship between the home gateway and the IPv4 terminal, thus achieving the objective of acknowledging accuracy of establishment of the channel for managing the IPv4 terminal.

Embodiment 9

Figure 10:
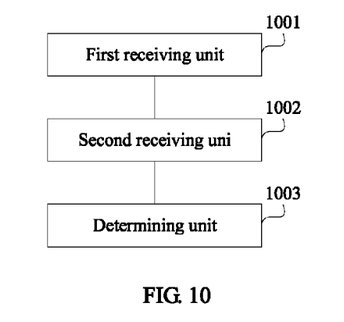
FIG. 10 is a schematic structural diagram of a management device according to Embodiment 9 of the present invention.

FIG. 10 is a schematic structural diagram of a management device according to Embodiment 9 of the present invention, where the management device may be a dual-stack management server used in a DS-lite network environment. The management device may specifically include:

a first receiving unit 1001, configured to receive a first mapping relationship sent by an IPv4 terminal through a channel established by a network gateway for managing the IPv4 terminal, where the first mapping relationship is a binding relationship between an identifier of the IPv4 terminal and an identifier that is received by the IPv4 terminal and sent from a home gateway;

a second receiving unit 1002, configured to receive a second mapping relationship sent by the home gateway, where the second mapping relationship is a binding relationship between an identifier, which is received by the home gateway and sent from the IPv4 terminal, and an identifier of the home gateway; and a determining unit 1003, configured to: when determining that the second mapping relationship is the same as the first mapping relationship, determine that the channel for managing the IPv4 terminal is established correctly.

To conclude, the management device provided by Embodiment 9 obtains the binding relationship between the identifier of the IPv4 terminal and the identifier of the home gateway from the IPv4 terminal and the home gateway respectively, and compares obtained binding relationships to verify the binding relationship between the home gateway and the IPv4 terminal, thus achieving the objective of acknowledging accuracy of establishment of the channel for managing the IPv4 terminal.

Embodiment 10

Figure 11:
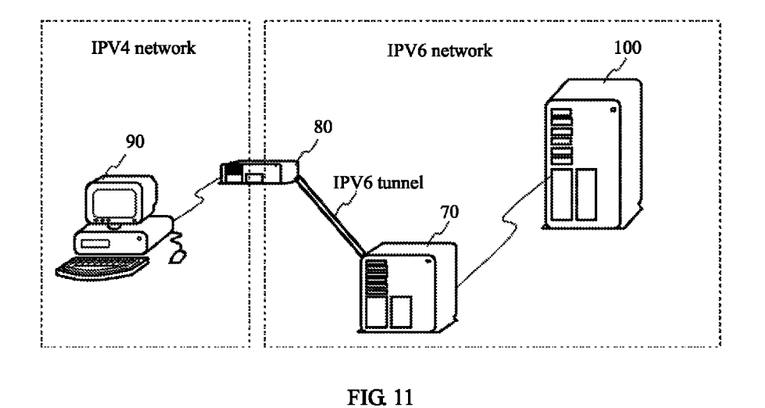
FIG. 11 is a composition diagram of a system for establishing and verifying a channel for managing an IPv4 terminal according to Embodiment 10 of the present invention.

FIG. 11 is a composition diagram of a system for establishing and verifying a channel for managing an IPv4 terminal according to Embodiment 10 of the present invention. The system for establishing and verifying a channel for managing an IPv4 terminal may be used in a DS-lite network environment. The system for establishing and verifying a channel for managing an IPv4 terminal may include: the network gateway 70 in Embodiment 6, the home gateway 80 in Embodiment 7, the IPv4 terminal 90 in Embodiment 8, and the management device 100 in Embodiment 9.

To conclude, with the system for establishing and verifying a channel for managing an IPv4 terminal according to Embodiment 10, the network gateway receives an identifier of a network port of the IPv4 terminal sent by the IPv4 terminal through the home gateway, and opens, according to the identifier of the network port, a listening port that may be long-time maintained for the IPv4 terminal, where the listening port is used for receiving a management message sent by the management device to the IPv4 terminal; and a channel for managing the IPv4 terminal may be established without a third-party device. Thereby, the objectives of simplifying DS-lite deployment, reducing maintenance difficulty, and saving deployment and maintenance costs are achieved. In addition, with the system for establishing a channel for managing an IPv4 terminal according to Embodiment 10, the management device obtains the binding relationship between the identifier of the IPv4 terminal and the identifier of the home gateway from the IPv4 terminal and the home gateway respectively to verify the binding relationship between the home gateway and the IPv4 terminal, thus achieving the objective of improving accuracy of managing the IPv4 terminal by the management device.

It should be noted that when the network gateway, home gateway, IPv4 terminal, and management device according to the above embodiment establish a channel for managing the IPv4 terminal, only division of the above functional modules is illustrated. In actual applications, the above functions may be allocated, according to requirements, to different functional modules for completion, that is, the internal structure of the apparatus is divided into different functional modules for completing all or part of the functions described above. In addition, the system for establishing and verifying a channel for managing an IPv4 terminal according to the above embodiment and the embodiment of the method for establishing and verifying a channel for managing an IPv4 terminal belong to the same concept, and the specific implementation process of the system is described in the method embodiment, and is not further described here.

Persons of ordinary skill in the art should understand that all or part of the steps of the foregoing embodiments may be implemented through hardware, and may also be implemented by a program instructing relevant hardware. The program may be stored in a computer readable storage medium. The storage medium may be a read-only memory, a magnetic disk, or an optical disk.

The foregoing descriptions are merely exemplary embodiments, but are not intended to limit the present invention. Any modification, equivalent replacement, or improvement made within the spirit and principle of the present invention shall all fall within the protection scope of the present invention.

What is claimed is:

1. A method for establishing a channel for managing an IPv4 terminal, the method comprising:
    receiving, by a network gateway, an identifier of a network port of the IPv4 terminal sent by a home gateway, wherein the network gateway is configured to communicate with a management server using IPv6 packets;
    allocating, by the network gateway, a listening port to the IPv4 terminal according to the identifier of the network port of the IPv4 terminal, so as to establish the channel for managing the IPv4 terminal by the management server between the network port and the listening port, so that the IPv4 terminal is remotely managed by the management server;
    receiving, by the management server, a first mapping relationship that is sent by the IPv4 terminal through the channel established by the network gateway, wherein the first mapping relationship is a binding relationship between an identifier of the IPv4 terminal and an identifier that is received by the IPv4 terminal and sent from the home gateway;
    obtaining a second mapping relationship sent by the home gateway, wherein the second mapping relationship is a binding relationship between an identifier, which is received by the home gateway and sent from the IPv4 terminal, and an identifier of the home gateway;
    determining that the second mapping relationship is the same as the first mapping relationship; and
    determining that the channel for managing the IPv4 terminal is established correctly.

2. The method according to claim 1, further comprising:
- establishing a third mapping relationship between the listening port and the network port of the IPv4 terminal; and
- sending the third mapping relationship to the home gateway so that the home gateway forwards data between the network port and the listening port according to the third mapping relationship.

* * * * *